UNITED STATES PATENT OFFICE.

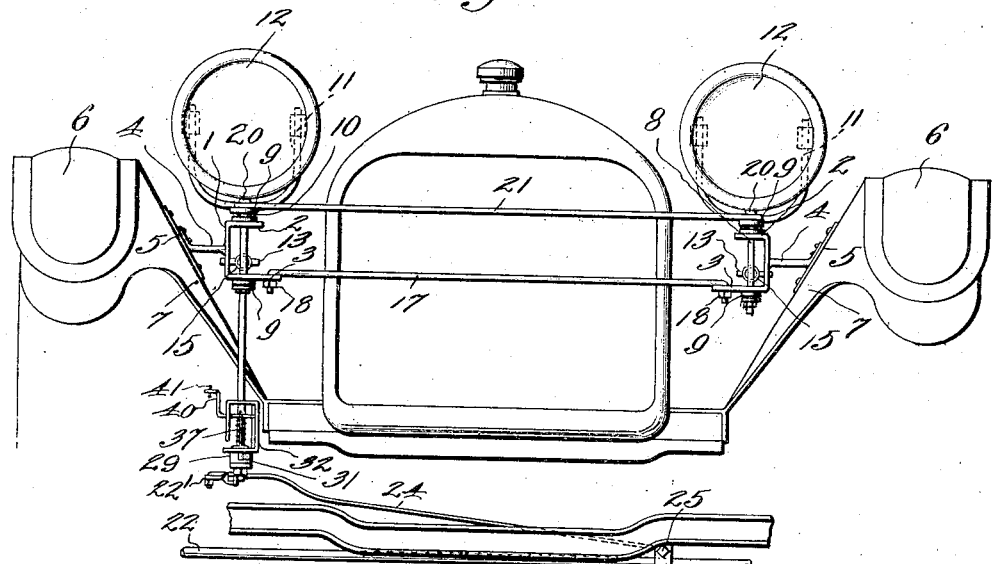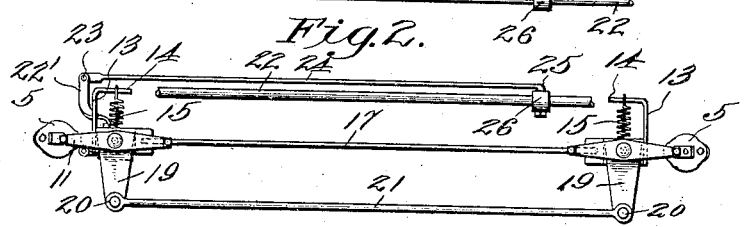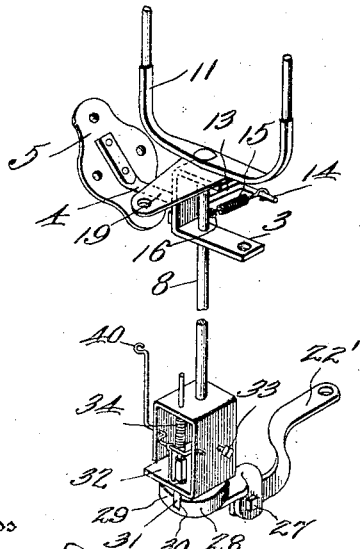

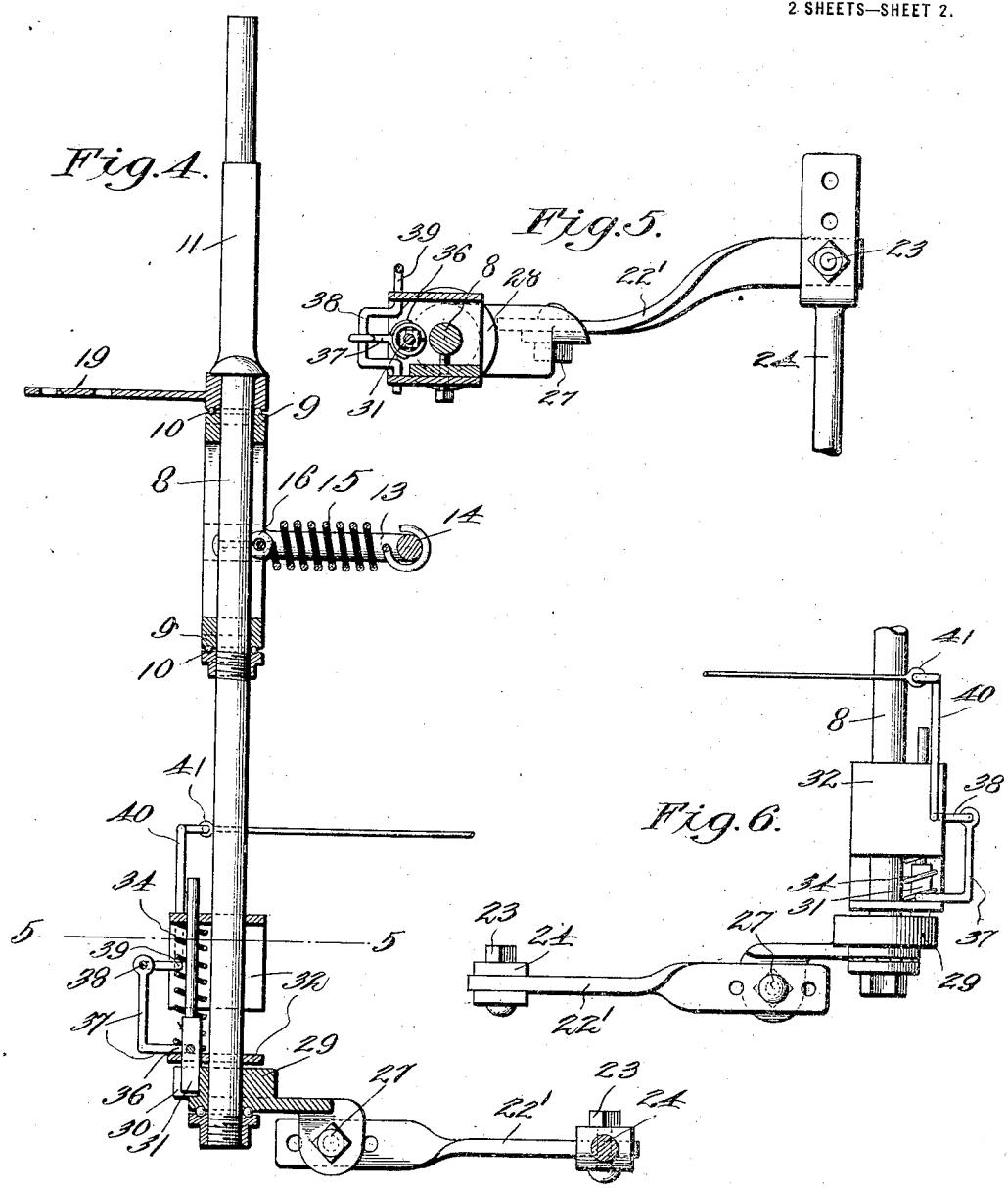

FRANK CAMMARATA, OF AMITE, LOUISIANA.

DIRIGIBLE HEADLIGHT.

1,240,668. Specification of Letters Patent. Patented Sept. 18, 1917.

Application filed October 20, 1916. Serial No. 126,749.

*To all whom it may concern:*

Be it known that I, FRANK CAMMARATA, a subject of the King of Italy, residing at Amite, in the parish of Tangipahoa and State of Louisiana, have invented certain new and useful Improvements in Dirigible Headlights, of which the following is a specification.

This invention relates to dirigible headlamps for vehicles, the object in view being to provide in connection with headlamps mounted to turn on substantially vertical axes, operating means automatically controlled by the steering mechanism of the machine, whereby the headlamps are turned at angles corresponding with the angles assumed by the steering wheels of the vehicle, for the purpose of directing the rays of light on that part of the road-way which is about to be followed by the vehicle and consequently avoiding many of the serious accidents which now occur by reason of the fact that the rays of light continue to be thrown ahead in line with the longitudinal axis of the machine after the steering wheels have been turned to direct the machine to one side or the other.

The principal object of the present invention is to provide means whereby, during the day time, the lamp turning mechanism may be thrown out of operation so as to save wear on the operative parts of the lamp turning mechanism, and whereby the lamp turning mechanism may again be thrown into operation at night fall or whenever desired.

With the above and other objects in view, the invention consists in the novel construction, combination and arrangement of parts, herein fully described, illustrated and claimed.

In the accompanying drawings:—

Figure 1 is a front elevation of an automobile showing the lamp turning mechanism in its applied relation thereto.

Fig. 2 is a plan view of the same.

Fig. 3 is a perspective view of the lamp turning mechanism.

Fig. 4 is a vertical fore and aft section taken in line with the lamp post which has the operating or lamp turning arm associated therewith.

Fig. 5 is a section on the line 5—5 of Fig. 4 showing the locking or latching means.

Fig. 6 is a fragmentary front elevation showing the lower portion of one of the lamp-posts, including the lamp turning arm and the latch mechanism.

Referring to the drawings 1 designates a pair of lamp supporting brackets each comprising an upper horizontally extended bearing portion 2 and a lower horizontally extended bearing portion 3. Each bracket also comprises a supporting arm 4 having a fixed relation to the upright portion of the bracket, and also having an attaching base or flange 5 adapting the bracket to be riveted or otherwise fastened to the adjacent mud guard 6 of the machine and preferably to the inner apron 7 of the mud guard.

Journaled in the upper and lower portions of each bracket is a lamp-post 8, the bearings 9 for said post being preferably of the anti-friction ball type as indicated at 10. Each post has rigidly attached to or formed integrally with the upper extremity thereof the usual head lamp carrying fork 11, 12 designating the headlamp. Extending at right angles to each bracket and fixedly attached thereto is an arm 13 having a laterally extended end portion 14 to which is attached one extremity of a lateral centering spring 15, the other extremity of said spring being attached to an eye 16 or its equivalent extending laterally from the adjacent lamp-post 8. The spring 15 extends in a fore and aft direction and its tension is exerted to maintain the lamp in a position to throw the rays of light straight ahead, while permitting the lamp-post to turn for directional purposes. The lower bearing portion of each supporting bracket is extended sufficiently to provide for the formation therein of a hole to receive one of the bent extremities of a brace rod 17, such bent end of the brace rod being shown as threaded and secured in place by means of a nut 18. By reason of the construction and arrangement shown and described, the brace rod 16 taken in connection with the lamp supporting brackets, also serves to brace the front mudguards of the vehicle. Each of the lamp-posts also has an arm 19 extending in a fore and aft direction therefrom and these arms 19 are connected by pivots 20 to a connecting or equalizing rod 21, causing both lamps to be turned simultaneously and equally in the same direction, when motion is imparted to one of said lamps.

One of the posts 8 is of considerably greater length than the other, being extended downwardly to a point approximately on the level with the steering knuckle arm connecting rod 22, the purpose of which will appear. Journaled on the lower extremity of the last named lamp-post 8 is a lamp turning arm 22'. This arm is connected by a pivot 23 at its free end to one extremity of a lamp turning rod 24 which is connected by a pivot 25 to a clamp-like fitting 26 which is secured to the connecting rod of the steering knuckles so that as the last named rod is moved to the right or to the left by the usual steering connections, a corresponding movement is imparted to the lamp turning arm 22'. At its inner end the lamp turning arm is connected by means of a pivot bolt 27 to a head 28, the bolt 27 enabling the arm 22' to be adjusted at different angles to the head so that the free end of the arm may be elevated or depressed to better adapt the device as a whole to be applied to automobiles of different makes. The head 28 comprises a disk-like portion 29 having a notch 30 in the periphery thereof, which notch is adapted to receive the lower extremity of a slidable locking bolt or latch 31. This bolt or latch is slidably mounted in a latch guiding member 32 formed with guide openings to receive said latch and also carrying a set screw 33 adapted to bind against the lamp-post in order to prevent the latch guide from turning relatively to and around said post. A coiled expansion spring 34 encircles the latch within the latch guide, one end of said spring bearing against the top wall of the latch guide and the other extremity of said spring bearing against the looped extremity 36 of a link 37, said looped extremity or portion of the link passing through a hole in the latch and bearing against the lower extremity of the latch thrust spring above referred to. The other end of the link 37 is connected to and operated by the crank arm 38 of a latch operating shaft 39 which is journaled in the opposite side walls or portions of the latch guide and provided with a latch operating arm 40 having attached to the free end thereof a suitable connection 41, which leads back through the dash or front of the vehicle to a point within reach of the operator of the vehicle who may exert a pull thereon in order to slide the latch or locking member out of engagement with the disk-like head portion of the lamp turning arm.

From the foregoing description, taken in connection with the accompanying drawings, it will now be understood that when the locking member or latch is in engagement with the lamp turning arm, a movement imparted to said arm will result in a turning movement of the lamp-post with which said arm is associated and by reason of the connecting rod which extends between the arms of the two lamp-posts, corresponding movement will be imparted to the other lamp. Therefore both lamps will be correspondingly and equally turned in the same direction. The arrangement just described obtains after night fall and insures the illumination of the road-way on that side to which the vehicle is turning. In the day time, when it is not necessary to turn the lamps, the operator pulls back on the operating connection leading to the latch operating shaft and thus withdraws the latch from engagement with the lamp turning arm. Any suitable means may be employed for holding the parts in this position during the day time. When the latch is withdrawn, the lamp turning arm may swing without affecting the lamp-post with which it is associated and thereafter both lamp-posts remain stationary, being held by means of the centering springs above described which maintain the lamps in a straight forward facing position. This prevents wear on the lamp-posts and their supporting brackets and bearings during the day time.

I claim:—

1. The combination with a vehicle head lamp, and a substantially vertical post by which said lamp is carried, of a lamp supporting bracket in which said post is journaled, a lamp turning arm normally loose on said lamp-post, an operating connection between said lamp turning arm and the steering knuckle connecting rod of the vehicle steering mechanism, a latch guide fastened to, carried by and rotatable with said lamp-post, a slidable latch carried by said guide and movable into and out of engagement with said lamp turning arm, and latch operating means.

2. The combination with a vehicle head lamp, and a substantially vertical post by which said lamp is carried, of a lamp supporting bracket in which said post is journaled, a lamp turning arm normally loose on said lamp-post, an operating connection between said lamp turning arm and the steering knuckle connecting rod of the vehicle steering mechanism, a latch guide fastened to, carried by and rotatable with said lamp-post, a slidable latch carried by said guide and movable into and out of engagement with said lamp turning arm, and latch operating means comprising a spring which acts to thrust the latch into engagement with the lamp turning arm, a crank shaft journaled in and carried by the latch guide, and a link connecting the latch with said crank shaft.

3. The combination with a vehicle head lamp, and a substantially vertical post by which said lamp is carried, of a lamp supporting bracket in which said post is journaled, a lamp turning arm normally loose on said lamp-post, an operating connection between said lamp turning arm and the steering knuckle connecting rod of the vehicle steering mechanism, a latch guide having a fixed relation to said lamp-post, a latch guided thereby and movable into and out of engagement with said lamp turning arm, latch operating means, said latch operating means comprising a spring which acts to thrust the latch into engagement with the lamp turning arm, a crank shaft journaled in the latch guide, and a link connecting the latch with said crank shaft, said link also serving to compress the latch thrust spring.

In testimony whereof, I affix my signature.

FRANK CAMMARATA.

Copies of this patent may be obtained for five cents each, by addressing the "Commissioner of Patents, Washington, D. C."